United States Patent Office 3,348,874
Patented Oct. 24, 1967

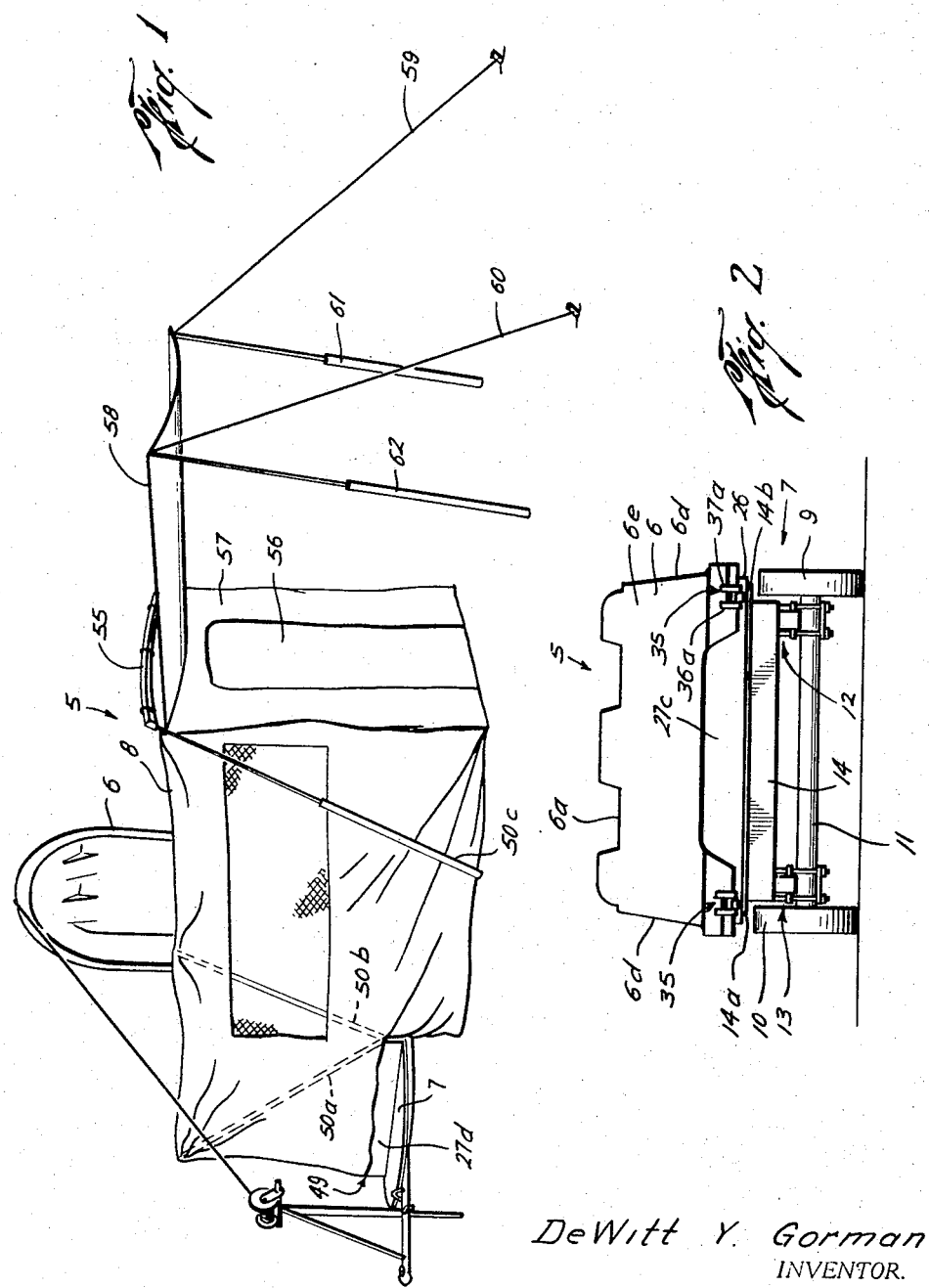

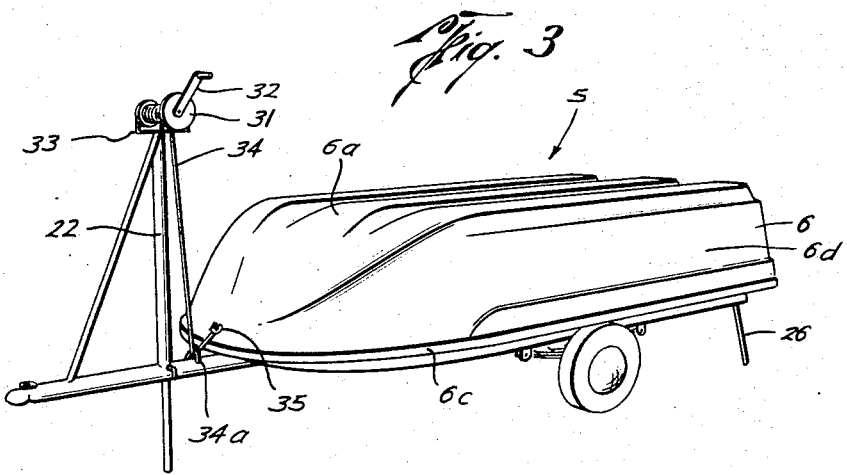
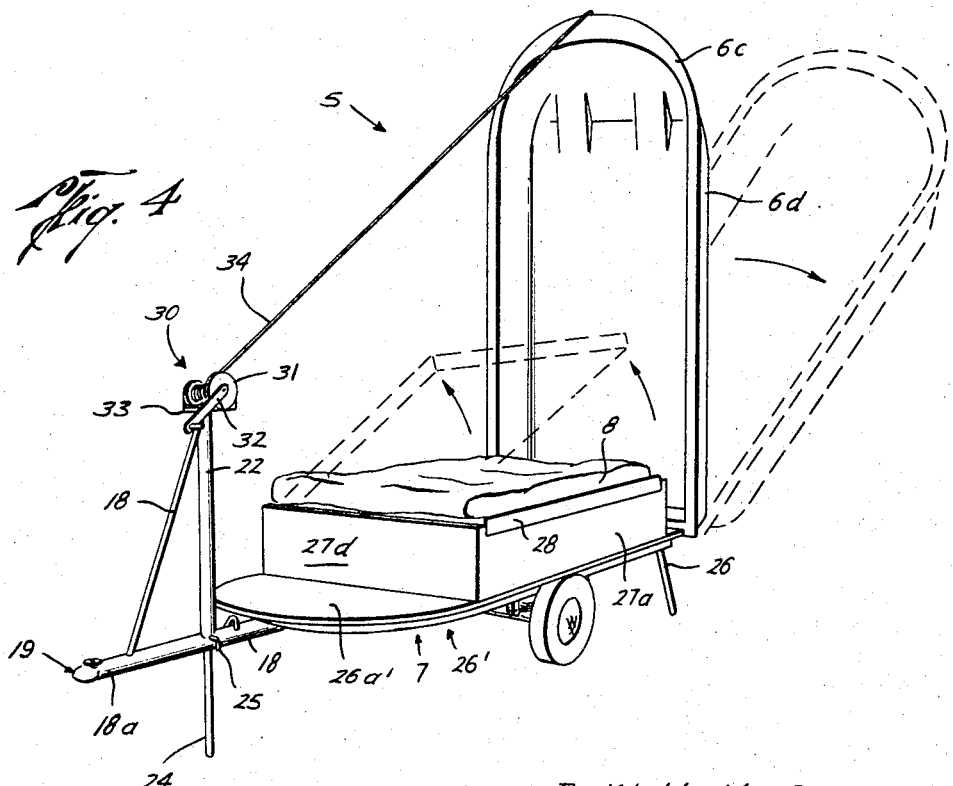

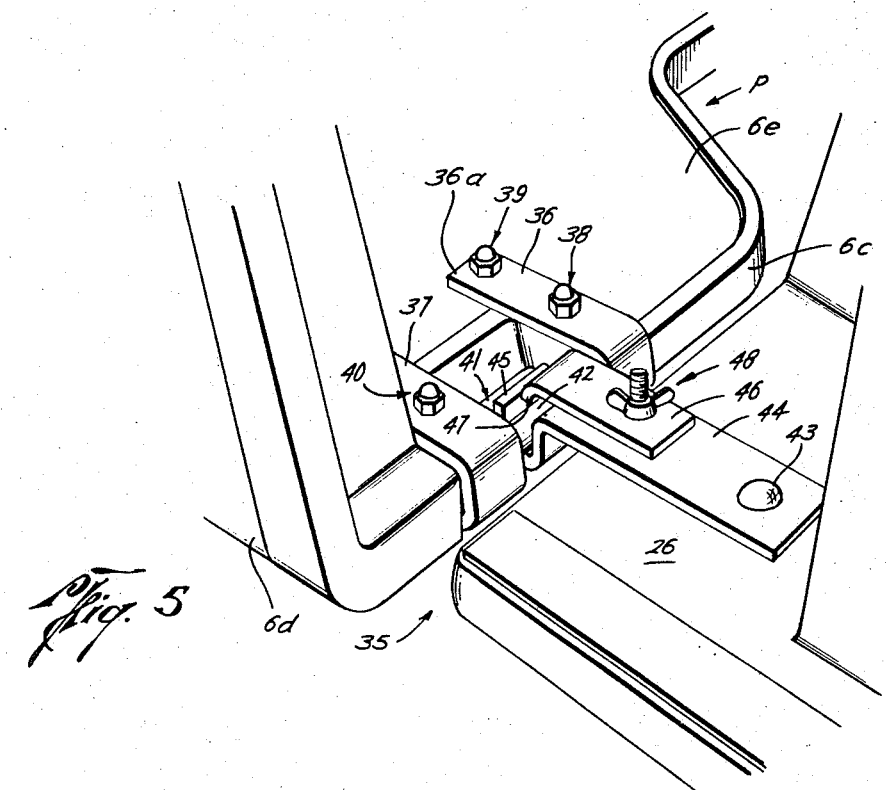
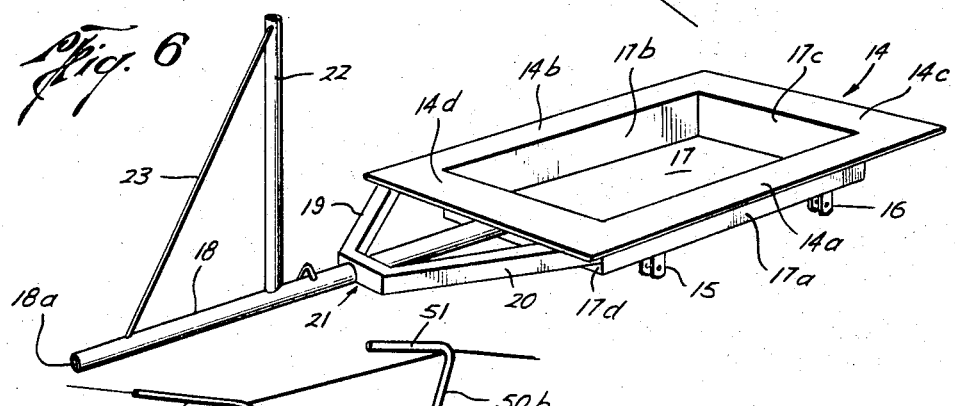
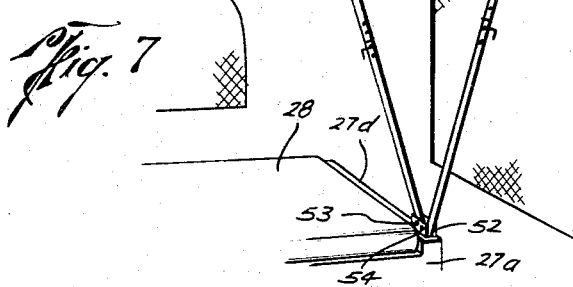

3,348,874
COMBINATION BOAT-TENT-TRAILER
APPARATUS
De Witt Y. Gorman, Houston, Tex., assignor to Caco Manufacturing Corp., a corporation of Texas
Filed Dec. 9, 1965, Ser. No. 512,742
2 Claims. (Cl. 296—23)

ABSTRACT OF THE DISCLOSURE

An apparatus utilizing a boat overturned on a trailer and secured by releasable engaging means to the trailer for enabling the boat to be rotated to a vertical position or to be removed from the trailer and used in the desired manner. The upper surface of the trailer contains a folded tent protected by the overturned boat, and when such boat is rotated to the vertical position or removed, the tent may be unfolded and utilized in the normal manner and the upper surface of the trailer is utilized as a bed for the tent.

This invention relates to a combination boat-tent-trailer apparatus.

A "camper" as that term is known in the art usually includes a trailer, tent and bed in a combined relationship wherein the trailer unfolds to provide a bed and the tent forms an enclosure over the bed. This type of camper is well known. Of course, to transport the camper to a given area, it is necessary to hitch the trailer to a car.

It is also well known that to transport a boat to a given area, it is usually necessary to position the boat on a boat trailer and hitch the boat trailer to a car.

However, when it is desired to take both the camper and boat at the same time to a designated or desired area, the respective trailers must be hitched end to end and one of the trailers thereafter hitched to a car. This arrangement presents problems of length and maneuverability and is prohibited by law in many states.

Accordingly, it is an object of the present invention to provide a combination boat-tent-trailer apparatus.

Another object of the present invention is to provide a combination boat-tent-trailer apparatus wherein the boat is detachably secured to the trailer in an overturned position and is disposed to cover and enclose the tent which is also secured on the trailer.

Yet another object of the present invention is to provide a combination boat-tent-trailer apparatus wherein the boat is removably mounted on the trailer in an overturned position and is so mounted that it is capable of being rotated around the back end of the trailer for removal from the trailer.

Still another object of the present invention is to provide a combination boat-tent-trailer apparatus wherein the top or upper surface of the trailer has a boat and a tent secured thereto, and wherein the tent is adapted to be unfolded to form an enclosure over the bed, said tent and bed being covered during use on the road by a boat which is also supported by said trailer.

A further object of this invention is to provide a new and improved combination boat-tent-trailer apparatus wherein a single trailer is constructed with a camper type tent thereon and for receiving a boat thereon over the tent so that a user may pull both a boat and a camper type tent on a single trailer behind his truck or automobile.

The preferred embodiment of this invention will be described hereinafter, together with other features thereof, and additional objects will become evident from such description and the invention will be more readily understood from a reading of the following specification by reference to the accompanying drawings forming a part thereof, wherein an example of this invention is shown, and wherein:

FIG. 1 is an elevated view illustrating the relationship of the trailer and boat to the tent embodiment;

FIG. 2 is a view illustrating the position of the transom of the boat while being supported by the trailer;

FIG. 3 is a perspective view illustrating the position of the boat while being supported by the trailer;

FIG. 4 is a view illustrating the vertical position of the front of the boat relative to the transom of the boat and trailer when loading and unloading the boat;

FIG. 5 illustrates a hinge assembly for securing the boat to the trailer;

FIG. 6 is an elevated view illustrating the frame and a storage area of the trailer; and FIG. 7 is a partial, sectional view taken inside of the enclosure formed by the tent and illustrating the telescope coupling arrangement of the tent poles.

The present invention, as illustrated in FIGS. 1–4 is generally designated at 5 and comprises a boat 6, a combination boat trailer and camping trailer 7 and a tent 8.

As illustrated in FIGS. 2–6, the combination trailer 7 of the present invention 5 is shown as having a pair of wheels and tires 9 and 10 which are, of course, for transporting the remaining portion of the trailer, the boat 6, and the tent 8 to desired locations. Mounted between the wheels 9 and 10 is an axle 11 which is of a construction well known in the art, and mounting and supporting the axle 11 of the combination trailer is a pair of springs generally designated at 12 and 13, respectively, and which are also well known in the art. It should be noted and understood that if it is desired to lengthen the trailer 7, a plurality of tires and wheels may be needed and can easily be utilized and added when desired or when necessary. The supports or springs 12 and 13 are mounted and secured to a lowermost member 14 of the trailer 7 on the bottom member 17 by a plurality of spring connecting means 15 and 16, as illustrated in FIG. 6. The lowermost member 14 of the combination trailer 7 includes a rectangular bottom 17 having upwardly-extending sides 17a, 17b, 17c, and 17d and flanged or lipped sides substantially transverse to the upwardly-extending sides 17a to 17d, designated at 14a, 14b, 14c, and 14d. It is, of course, to be understood that the lowermost member 14 may be of any other shape as desired, so long as it may be used for the lowermost member of a trailer.

The enclosure formed by the bottom 17 and sides 17a through 17d of the lowermost member 14 may, of course, be used as an area for storage which is a desirable feature and almost a necessity when camping.

Secured to the front of the lowermost member 14 at the outer surface of the upwardly extending side 17d and the under surface for the flanged edge 14d is a bar or hitch pole 18 which extends from the side 17d longitudinally relative to the lowermost member 14. The hitch pole 18 is used to support the front of the combination trailer 7 and is also used for securing the boat trailer to a car and the like by attaching a trailer hitch 19' to one end 18a of the pole 18. Also mounted on the outer surface of the upwardly-extending side 17d and the under surface of the flange 14d is a pair of support poles 19 and 20 which extend in an angularly direction outwardly from the lowermost member 14 to be secured or mounted to the trailer hitch pole 18, as generally designated at 21, in any manner such as welding.

Secured to the trailer hitch pole 18 on the top thereof is a guide pole 22 which extends upwardly substantially transverse to the trailer hitch pole 18 and which is provided with a support bar 23 connected to the trailer hitch pole 18 and the guide pole 22 by any suitable manner to strengthen the securement of the guide pole 22 with the trailer hitch pole 18.

To insure that the lowermost member 14 will remain substantially in a horizontal plane relative to the ground. The guide pole 22 extends through an opening (not shown) in the pole 18; the pole 22 telescopically receives a level bar 24 which can be dropped through the hole of the trailer hitch pole 18 to thereby extend outwardly and downwardly from the guide pole 22 any desired length to contact the ground to insure that the trailer 7 will be substantially level or horizontal with the ground or earth. When it has been ascertained that the boat trailer is level, a set screw 25 may be manipulated to lock the level pole 24 in its extended position.

Attached to the bottom 17 of the lowermost member 14 and adjacent upwardly-extending side 17c are a pair of stabilizer poles 26 which insure that the trailer will remain in a stabilized position and will not dip or rotate toward the ground when additional weight is applied to that area. It should be readily apparent that the stabilizer poles 26, the pole 24, and the wheels or tires 9 and 10 provide a broad base support for the trailer to stabilize the trailer in a plane substantially parallel to the ground.

Secured to and mounted with the lowermost member 14 of the trailer and substantially covering the flanges 14a through 14d is a substantially flat member generally designated at 26' which extends outwardly from the flange 14d to substantially the connection point of the support bars 19 and 20 with the trailer hitch pole 18 which has been generally designated at 21. As illustrated in FIG. 4, the flat member 26' is shown as having an arcuately-curved front 26a'. It is to be noted that the flat member 26 substantially covers the enclosure formed by the bottom and sides of the lowermost member 14 and that access thereto may be had by a hinged door or any other type means (not shown).

Mounted with the upper surface of the flat member 26' is a box or enclosure 27 having sides extending upwardly transverse to the flat member 26', each of the sides being designated as 27a, 27b, 27c, and 27d with only sides 27a and 27d illustrated. It is to be noted that the box structure 27 substantially covers the flat member 26' but leaves exposed an outer rim adjacent flanges 14a, 14b, and 14c. It should also be noted that the box structure or enclosure 27 does not cover the arcuate front 26a' of the flap member 26'.

As illustrated in FIG. 4, the upper surface or top of the box structure 27 is covered with a mattress 28 which is substantially rectangular in shape and which is used for a purpose to be brought out hereafter. The box or enclosure 27 may be used as a storage area and access thereto may be provided by hinging the mattress and upper surface of box 27 so that a side of the mattress 28 adjacent the side 27a of the box structure 27 may be lifted in an upwardly direction. Folded on the mattress 28 of the box structure 27 is a tent 8 which is used in a manner to be brought out hereinafter.

Mounted at the upper end of the guide pole 22 is a guide means generally designated at 30 which includes a wench drum 31, turn bar 32, a support therefor 33, and, of course, a wench line 34, which is adapted to be wound around the wench drum 31. As illustrated in FIGS. 3 and 4, the wench line 34 is releasably secured to the boat 6 by a snap 35 or other means attached to the front of the boat 6 and the boat 6 is secured to the trailer 7 by passing the line 34 through a hook 34a secured to trailer hitch pole 18 and subsequently attaching the line 34 to the snap 35 on the boat 6.

As illustrated in FIGS. 2 and 3, when the present invention 5 is being transported, the boat 6 is positioned to rest and be supported and carried by the combination trailer 7 in an overturned position such that the bottom 6a of the boat is facing in an upwardly direction. The lip 6c around the sides 6d of the boat rests and is supported by that portion or rim of the flat member 26 that is exposed and extending from the box structure 27 and the arcuate front 26a. Thus, the boat 6 provides a suitable and safe cover and enclosure for the folded tent 8 and mattress 28 while traveling to any desired location.

When it is desired to expose the tent 8 to thereby unfold it and form a tented enclosure, the boat 6 is lifted or rotated to a vertical position relative to the transom or back 6e of the boat and the trailer 7. Of course, it should be understood that the line 34 must be unwound to allow the boat to be lifted to this position.

As illustrated in FIGS. 2, 4, and 5, a releasable engaging means or hinge assembly, designated generally at 35, is the pivotal point about which the boat rotates when lifted to its vertical position and thereafter lowered into the water or onto the ground. As illustrated in FIG. 5, the hinge assembly or releasable engaging means 35 in the preferred embodiment is provided with a pair of U-shaped members 36 and 37 which are positioned to fit over the edge 6c of the boat 6 adjacent the side 6d of the boat and on the upper portion of the transom or back 6e of the boat. The U-shaped members 36 and 37 are positioned so that the ends 36a and 37a (not shown) extend toward the bottom 6a of the boat and are positioned or secured to the transom by a plurality of nuts and bolts such as illustrated at 38, 39, and 40. It should be noted that the transom 6e is provided with an opening generally designated at P which, of course, is for permitting propelling means (not shown) to be secured to the boat. Adjacent the propelling means opening P on each side thereof is a pair of slotted openings 41 in the transom 6e. It should further be noted that while one of the hinge assemblies 35 is shown in detail in FIG. 5, there is provided a pair of the hinge assemblies 35 as illustrated in FIG. 2 for manipulating, rotating, and lowering the boat 6 in any desired position.

Parallel to the edge 6c of the transom 6c and positioned in the opening 41 is a cross bar or bolt 42 which is secured to each of the U-bolt members 36 and 37. Secured to the flat member 26 by a nut and bolt 43 or other suitable means is an arm 44 which extends outwardly from the flat member 26 adjacent the flanged side 14c in a longitudinal direction relative to the lowermost member 14. The arm 44 includes an arcuate or semicircular finger 45 which is adapted to overlap or partially envelope the bar 42. Positioned on the arm 44 is a hold member 46 which extends outwardly parallel to the arm 44 and which is provided at the end adjacent the bar 42 with a curved end 47 which projects toward the bar 42. The hold bar or arm 46 is secured to the flat member 26 and the flanged side 14c and is positioned on arm 44 by a releasable nut and bolt designated at 48. Thus, when the hold bar 46 is secured to the flanged side 14c and on the arm 44, the curved edge 47 and the semicircular finger 45 of the arm 44 form a substantially circular enclosure around the bar 42 so that the transom or back 6e of the boat is secured to the trailer and will not become disengaged from flat member 26. Thus, as has been brought out heretofore, the boat 6 may be rotated or moved or lifted to a horizontal position relative to the transom 6e and the boat trailer and the hinge assembly 35 retains the boat 6 and the trailer 7 in releasable engagement.

When it is desired to lower the boat into the water, all that is required is to back the trailer to the water's edge and lift the boat to the vertical position as illustrated in FIG. 4 and then by using the guide means 30, the boat can be easily lowered into the water, as illustrated by the dotted line in FIG. 4. Then, it is necessary to release or disengage the transom of the boat from the flat member 26 and this is done by unscrewing the releasable nut and bolt means 48 and lifting the hold bar 46 from the flat member which thereby permits the finger 45 of the arm 44 to be separated from its enveloping position relative to the bar 42.

It should be understood that the hinge assembly or releasable engaging means 35 may also be positioned on the side 6d of the boat so that the boat may be rotated transverse to the longitudinal extension of the trailer or thereafter removed from the trailer. It is to be noted that the boat 6 is provided with portable seats (not shown) which are mounted with the boat when it is to be used in the water.

As illustrated in FIGS. 1 and 4, the tent 8 is secured to the box structure 27 of the trailer 7 as generally designated at 49 by a plurality of snaps (not shown). Of course, when the boat 6, trailer 7, and tent 8 are being transported, the tent is in a folded position so that it may be covered and protected from natural and manmade elements by the overturned boat 6. After arrival at the point of destination, the boat may be rotated and lifted or removed from the boat trailer, as brought out hereinabove. In any event, with the boat in a vertical position or removed, the tent then may be unfolded and set up for use. Thus, as illustrated in FIG. 1, where one embodiment of a tent 8 is shown, the tent 8 has been unfolded and is ready for use and is shown as being supported by a plurality of telescoping bars 50 which operate substantially in the same manner as the lever bar 24 does in the guide bar 22 of the trailer as brought out hereinabove. As illustrated in FIGS. 1 and 7, the tent 8 utilizes the mattress 28 and upper surface of the box structure 27 for a bed or bunk.

The telescoping bars 50 may be conveniently folded (not shown) along the edges of the mattress 28 and when it is desired to set up, unfold, and form an enclosure with the tent, the telescoping poles 50 may then be raised so that one of the poles 50a supports the back or one side of the tent and the other pole 50b supports the middle portion of the tent. It should be noted that the poles 50a and 50b, while being used as supports extend upwardly and are provided at one end with transversely positioned bars 51 which further support the tent 8. The poles 50a and 50b are connected to the side 27d adjacent the side 27a of the box structure 27 and are secured in a pivot box 52 by pivot pins 53 and 54 so that they may be rotatably moved for storage or for forming the enclosure with the tent. It is to be understood that the other side 27c of the box structure 27 is provided with a similar pivot box and related structure.

As illustrated in FIG. 1, a support pole 50c is used to support the front of the tent and is positioned to extend from the ground in an upwardly, angular direction to prevent the front of the tent from collapsing. The pole 50c is similar in construction to another pole (not shown) which is in substantially the same position on the other side of the tent and that such poles supporting the front of the tent are secured to the tent by a cross bar 55 which is connected at each end thereof to the poles and which is itself connected with tent.

The tent is provided with a door or opening for a door 56 and a plurality of windows not numbered, and is provided with a shaded front by attaching to the upper portion of the front 57 of the tent 8 a longitudinally-extending piece of canvas 58 or the like which is supported substantially parallel to the top of the tent by the support lines 59 and 60 which are attached to the ground and by a pair of poles 61 and 62 which are used to support the canvas 58 from the ground in a substantially parallel plane with the top of the tent 8.

Briefly, the present invention relates to the combination of a trailer having a top thereof to be used as a tent bed, a tent secured to the trailer, and a boat covering said tent and supported by the trailer for easy transportation thereof.

What I claim is:
1. A combination boat-tent-trailer apparatus comprising:
   (a) A boat adapted to be placed on a trailer in an overturned position and rotated to a vertical position and thereafter removed;
   (b) A trailer having an upper surface for use as a tent bed, said trailer being of substantially the same length as said boat for receiving said boat in an overturned position;
   (c) A camper-type tent bed mounted on said trailer in a folded position and protected by the cover of said boat, when said boat is in an overturned position on said trailer wherein rotation of said boat to a vertical position enables said tent to be unfolded to form an enclosure over said trailer;
   (d) Releasable engaging means mounted with the back end of said boat and said trailer for enabling said boat to be releasably secured with said trailer and to enable said boat to be removed from said trailer; and
   (e) A guide means releasably secured on the front end of said boat and mounted on said trailer for guiding the front end of said boat as said boat is rotated.
2. The structure as set forth in claim 1 wherein said releasable engaging means include a hinge assembly means for securing said boat to said trailer wherein rotation of said boat about the back end of said trailer enables said boat to pivot around said hinge assembly to its vertical and removable position.

References Cited
UNITED STATES PATENTS

| | | | |
|---|---|---|---|
| 2,459,026 | 1/1949 | Hardy | 296—23 |
| 2,817,852 | 12/1957 | Neilson | 296—23 |
| 2,845,663 | 8/1958 | Harr | 296—23 |

PHILIP GOODMAN, *Examiner.*

BENJAMIN HERSH, *Primary Examiner.*